Sept. 5, 1961 G. E. ATKINSON 2,998,830
UNIVERSAL SHOE FOR RECIPROCATING SAW
Filed June 27, 1960 2 Sheets-Sheet 1

INVENTOR
GEORGE E. ATKINSON
BY
*Leonard Bloom*
ATTORNEY

Sept. 5, 1961         G. E. ATKINSON        2,998,830
UNIVERSAL SHOE FOR RECIPROCATING SAW
Filed June 27, 1960                                  2 Sheets-Sheet 2
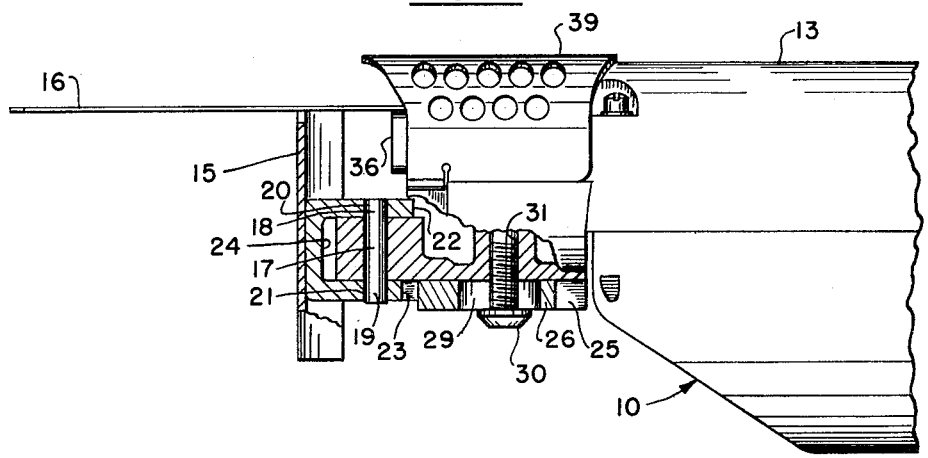
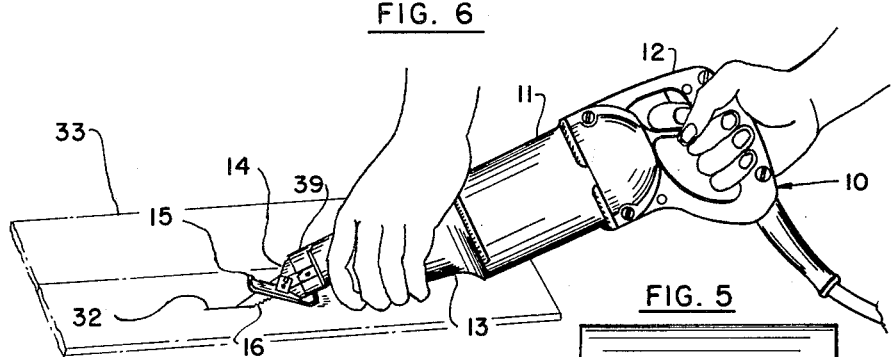
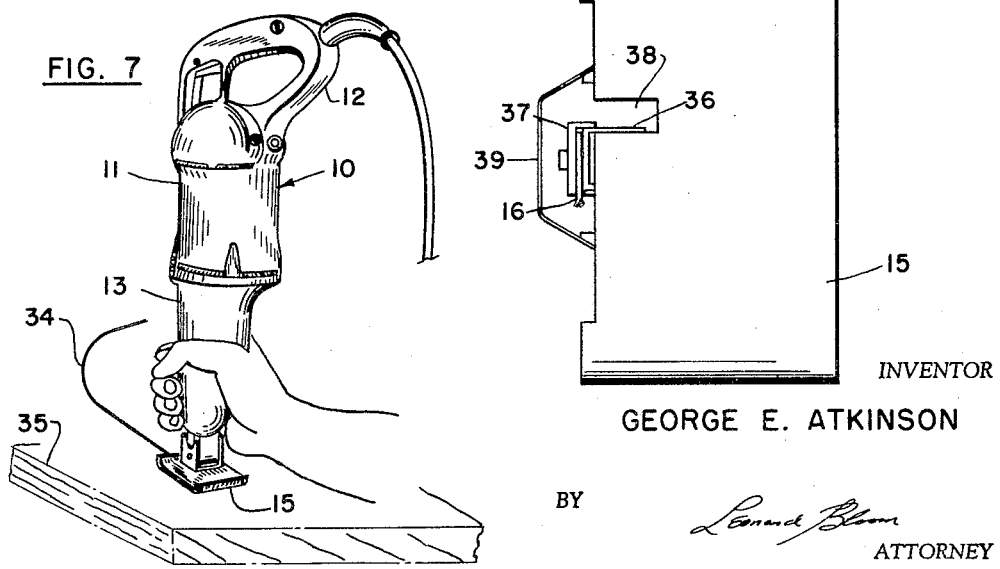
INVENTOR
GEORGE E. ATKINSON
BY
*Leonard Bloom*
ATTORNEY

United States Patent Office 2,998,830
Patented Sept. 5, 1961

2,998,830
UNIVERSAL SHOE FOR RECIPROCATING SAW
George E. Atkinson, Linthicum Heights, Md., assignor to The Black and Decker Manufacturing Company, Towson, Md., a corporation of Maryland
Filed June 27, 1960, Ser. No. 38,965
1 Claim. (Cl. 143—68)

The present invention relates to a universal shoe for a reciprocating power-operated saw, and more particularly, to such a shoe that is pivotably secured to the saw housing but which may be locked against pivoting movement as desired by the operator.

In the prior art of which I am aware, power-operated reciprocating saws known in the trade as sabre saws may be used for a variety of purposes, such as the making of rectangular openings, that is to say, a series of continuous pocket cuts in various work surfaces; and occasionally, such a saw may be used as a scroll saw in much the same manner as a conventional jig saw. These sabre saws are equipped with a suitable shoe, which is essentially a base upon which the saw may rest upon the work surface; and the shoes that have been used in the prior art are either of two types: (1) they may be rigid with respect to the saw housing, in which case the tool may be used either as a sabre saw or as a scroll saw, or (2) they may be allowed to pivot freely with respect to the saw housing, in which case the tool may be used only as a sabre saw.

If the sabre saw is provided with a rigid shoe, it may be used ideally as a scroll saw; but it is not too convenient to use the tool in the manner that a conventional sabre saw is used, that is to say, it may be somewhat difficult for the operator to approach the work to get the pocket cut started. The reason for this is that the operator will probably not be able to allow the shoe or a portion thereof to actually rest against the work surface at the initial onset of the cutting operation. Then again, if the sabre saw is provided with a pivotable shoe, that is to say, a shoe which is adapted to pivot freely about an axis generally transverse to the longitudinal axis of the tool or to the direction in which the reciprocating saw blade is working, the tool may be used more conveniently as a sabre saw than one which is provided with a rigid shoe; but such a tool simply cannot be used in the nature of a scroll saw. The reason for this is that in such an operation the saw generally is held in a vertical position, and it would be too hazardous and too inconvenient to use the tool in such a manner without having a rigid or firm support.

Accordingly, it is an object of the present invention to alleviate these difficulties by providing a universal shoe for a reciprocating saw, such that the tool may be used either ideally as a sabre saw or ideally as a scroll saw, as is desired by the operator.

It is another object of the present invention to provide a pivotable shoe for a sabre saw in which the pivoting action may be locked out so as to render the shoe rigid with respect to the tool housing.

It is yet another object of the present invention to provide a universal shoe that may be mass produced in quantity easily and economically.

These and other objects of the present invention will become apparent from a reading of the foregoing specification taken in conjunction with the enclosed drawings, in which:

FIGURE 4 is a view, partially in section and partially in pictorial illustration, taken along the lines 4—4 of FIGURE 3.

FIGURE 5 is a front elevational view of the shoe showing a portion of the blade and the clamping means;

FIGURE 6 illustrates the utility of the invention in making a pocket cut (when using the tool as a sabre saw) in which the shoe is free to pivot; and FIGURE 7 shows the shoe locked against pivoting movement and adapted for convenient usage as a scroll saw.

Figure 1:
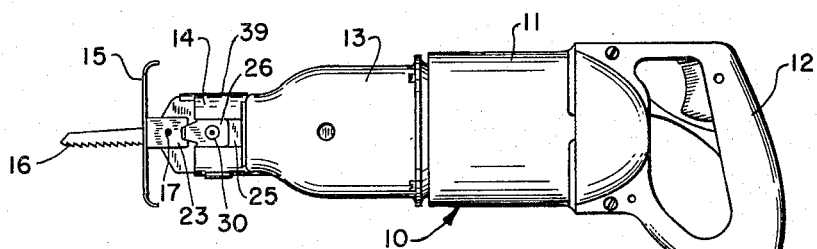
FIGURE 1 is a front elevational view of a conventional type of sabre saw which is equipped with the teachings of the present invention.

With particular reference to FIGURE 1, there is illustrated a sabre saw 10 which comprises a motor housing 11, a switch handle 12, a gear case 13, a forwardmost portion 14, a shoe 15, and a suitable blade 16.

Figure 2:
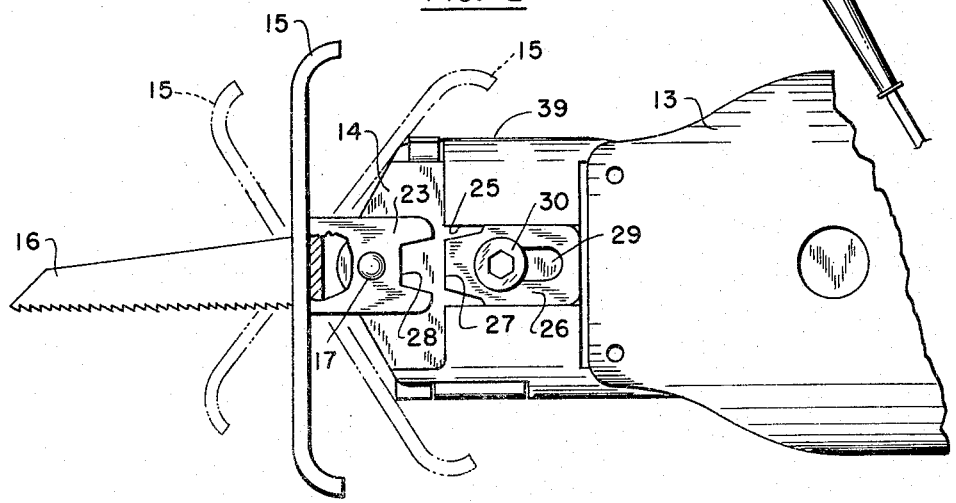
FIGURE 2 is an enlarged view of the forwardmost portion of the sabre saw as illustrated in FIGURE 1, showing the shoe in the pivotable position with respect to the saw housing, and further showing in phantom views the relative freedom of movement of the pivoting shoe.
Figure 3:
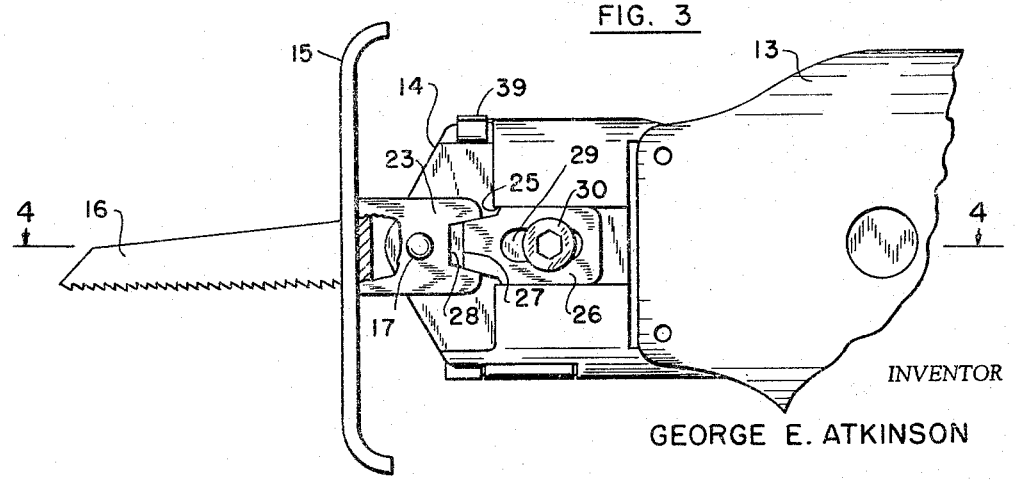
FIGURE 3 is a view corresponding to FIGURE 2, but showing the shoe locked against a pivoting movement with respect to the tool housing.

With particular reference to FIGURES 2–4, the forwardmost portion 14 of the sabre saw 10 has a transverse pin 17 pressed therein along an axis which is generally perpendicular to the longitudinal axis of the tool itself. Pin 17 has projecting portions 18 and 19, which are adapted to fit within corresponding holes 20 and 21 formed in the legs 22 and 23, respectively, of a U-shaped shoe bracket 24, the latter being secured in any convenient manner (such as by spot welding) to the under side of the shoe 15. This allows the shoe 15 to be pivoted freely with respect to the sabre saw 10 about the axis of pin 17, it being appreciated that the relative degree of pivoting (as illustrated in phantom view in FIGURE 2) will be determined in either direction by the geometry or the dimensions of various members, including of course the forwardmost portion 14 of the tool.

The forwardmost portion 14 of sabre saw 10 is further provided with a guide slot 25, which is formed in the same plane as leg 23 of shoe bracket 24, it being noted from FIGURE 4 that leg 23 has been made slightly longer than leg 22. A locking slide 26 is confined within the guide slot 25 and may be laterally adjusted therein by a manual manipulation. As shown more clearly in FIGURES 2 and 4, the locking slide 26 is provided with a tapered key 27 which is adapted to operatively engage a tapered keyway 28 formed in the leg 23 of the shoe bracket 24. Moreover, locking slide 26 is provided with a slot 29, and a suitable hexagonal head screw 30 passes through the slot 29 in the locking slide 26 to engage a threaded recess 31 formed in the forwardmost portion 14 of the sabre saw 10, as shown more particularly in FIGURE 4.

Hence, it will be appreciated that the locking slide 26 may be moved forwardly in the guide slot 25 such that the tapered key 27 will engage the tapered keyway 28 formed in leg 23 of the shoe bracket 24, and that the screw 30 may then be tightened within the recess 31 so as to hold the locking slide 26 steady in its adjusted position; and that in this manner the shoe 15 may be locked against a pivoting movement with respect to the sabre saw 10.

The inherent utility of the present invention may be more clearly appreciated from an examination of FIGURES 6 and 7. As shown in FIGURE 6, the locking slide 26 has been adjusted in the position shown in FIGURE 2, such that the shoe 15 may be allowed to pivot about the sabre saw 10; and in this position the sabre saw 10 may be used conveniently to make a pocket cut 32 in the work 33. In making such a pocket cut as is illustrated at 32 in FIGURE 6, it is very desirable to have a pivotable shoe 15 capable of a limited rocking movement about the work 33; and hence, in such a manner the entire sabre saw 10 may be tilted or canted to cause the blade 16 to dig into the work 33, thus allowing the pocket cut 32 to be started and continued more easily.

Then, when the locking slide 26 has been so adjusted as shown in FIGURE 3 such that the shoe 15 is no longer allowed to pivot but rather is rigid with respect to the overall sabre saw 10, the tool then may be used conveniently as a conventional scroll saw; and FIGURE 7 illustrates the sabre saw 10 being held vertically and a scroll cut 34 being made into the work 35. Also, the sabre saw 10 (in which the techniques of the present invention are utilized) has been so designed so as to be substantially balanced when held in a vertical position, that is to say, sabre saw 10 will rest by its own weight upon the work 35; hence, the operator does not have to support the tool against tipping or falling off of the work 35, but rather, he may use merely one hand in guiding the sabre saw 10 along in making the scroll cut 34.

A front elevation of the shoe is provided in FIGURE 5 in which a portion of the conventional reciprocating shaft 36 is illustrated together with means (indicated generally at 37) for clamping the blade 16 against the shaft 36. Under certain circumstances, it may be desirable to move the blade 15 at right angles with respect to the position shown in FIGURE 5, as is described in greater detail in the co-pending Atkinson et al. application Serial No. 61,916, filed October 11, 1960, and assigned to the same assignee of the present invention; and for this purpose a suitable slot 38 has been provided in the shoe 15 to allow the blade 16 to project therethrough. The blade 16 is also provided with a conventional type of guard 39, such as has been illustrated in FIGURE 4.

Obviously, many modifications may be made without departing from the basic spirit of the present invention; and therefore, within the scope of the appended claim, the invention may be practiced other than as has been specifically described.

I claim:

In a reciprocating saw of the character described, having a flat, elongated blade reciprocating parallel to the longitudinal axis of the saw and further having a housing including a forwardmost portion thereof, a universal shoe allowing said saw to be selectively used either as a sabre saw or as a scroll saw, comprising a shoe plate including a flat main portion thereof, said flat main portion of said shoe plate having a slot therein for the passage of the reciprocating blade therethrough, a U-shaped shoe bracket having a base secured to the rearward surface of said flat main portion of said shoe plate, said shoe bracket further having a pair of parallel legs extending rearwardly of said shoe plate at right angles to said flat main portion of said shoe plate and parallel to the plane of the blade, said legs straddling said forwardmost portion of the housing, one of said legs being slightly longer than the other of said legs and each of said legs having a hole formed therein, a pivot pin fixed in the forwardmost portion of the housing transverse to the longitudinal axis of the saw and having respective end portions projecting beyond the housing to seat within said holes in said legs, whereby said shoe plate may pivot about said pivot pin and parallel to the plane of the blade, the forwardmost portion of the housing having a guide slot formed on one side thereof, said guide slot being adjacent to and lying in the same plane as said longer one of said legs, a locking slide in said guide slot having a limited sliding movement therein parallel to the longitudinal axis of the saw, said longer one of said legs having a tapered keyway formed in the rearmost portion thereof, a corresponding tapered key formed on the forwardmost portion of said slide, the housing further having a tapped hole transverse to the longitudinal axis of the saw and parallel to and anteriorly of said pivot pin, said slide having a slot formed therein, and a screw having a portion thereof passing through said slot to engage said tapped hole, whereby said screw may be loosened and said slide moved in said slot so that said tapered keyway is disengaged from said tapered key and said shoe is allowed to pivot a predetermined amount with respect to the housing and about said transverse pivot pin to allow the saw to be used conveniently as a sabre saw, and whereby said tapered keyway may be engaged by said tapered key and said screw may then be tightened in said tapped hole to lock said shoe against pivoting with respect to the housing to allow the saw to be used conveniently either as a sabre saw or as a scroll saw.

References Cited in the file of this patent

UNITED STATES PATENTS

| | | |
|---|---|---|
| 919,610 | Maeder | Apr. 27, 1909 |
| 1,687,953 | Starks | Oct. 16, 1928 |
| 2,488,998 | Turkowski | Nov. 22, 1949 |
| 2,547,992 | Bechtold | Apr. 10, 1951 |
| 2,824,455 | Ristow et al. | Feb. 25, 1958 |